US012256711B1

(12) United States Patent
Shoemaker, Jr.

(10) Patent No.: US 12,256,711 B1
(45) Date of Patent: Mar. 25, 2025

(54) HAND HELD SNAKE SNARE

(71) Applicant: Stephen P. Shoemaker Trust, Manhattan Beach, CA (US)

(72) Inventor: Stephen P. Shoemaker, Jr., Redondo Beach, CA (US)

(73) Assignee: Stephen P. Shoemaker Trust, Manhattan Beach, CA (US)

( * ) Notice: Subject to any disclaimer, the term of this patent is extended or adjusted under 35 U.S.C. 154(b) by 0 days.

(21) Appl. No.: 18/622,558

(22) Filed: Mar. 29, 2024

(51) Int. Cl.
*A01M 23/34* (2006.01)
*A01K 15/00* (2006.01)

(52) U.S. Cl.
CPC .......... *A01K 15/003* (2013.01); *A01M 23/34* (2013.01)

(58) Field of Classification Search
CPC .............. A01K 15/003; A01M 23/34
See application file for complete search history.

(56) References Cited

U.S. PATENT DOCUMENTS

| | | | | | |
|---|---|---|---|---|---|
| 207,437 A | * | 8/1878 | Pemble | ................ | A01K 15/003 119/804 |
| 1,524,425 A | * | 1/1925 | Ellinghausen | ....... | A01K 15/003 119/804 |
| 1,540,640 A | * | 6/1925 | Lewis | ................... | A01M 23/34 43/87 |
| 1,623,774 A | * | 4/1927 | Bell | ...................... | A01K 15/003 119/804 |
| 2,224,474 A | * | 12/1940 | Draggoo | ............... | A01M 23/34 43/87 |
| 2,478,025 A | * | 8/1949 | Taylor | ................... | A01M 23/34 43/87 |
| 2,522,471 A | * | 9/1950 | Underwood | ......... | A01K 15/003 119/803 |
| 2,582,339 A | * | 1/1952 | Krueger | ............... | A01K 15/003 43/87 |
| 2,776,645 A | * | 1/1957 | Dooley | ................ | A01K 15/003 119/804 |
| 3,540,769 A | * | 11/1970 | Rosser | .................. | A01M 23/34 294/119.2 |
| 3,916,555 A | * | 11/1975 | Booth | .................. | G01B 3/1084 242/390.8 |
| 3,949,514 A | * | 4/1976 | Ramsey | ............... | A01K 15/003 43/87 |
| 4,020,585 A | * | 5/1977 | Benschoter | ........... | A01M 23/24 43/96 |
| 4,682,716 A | * | 7/1987 | Morellini | ................ | B25B 13/52 294/119.2 |

(Continued)

*Primary Examiner* — Monica L Perry
*Assistant Examiner* — Brittany A Lowery
(74) *Attorney, Agent, or Firm* — Fulwider Patton LLP

(57) ABSTRACT

A hand-held snake snare comprises an elongate hollow rod with a bracket mounted on a proximal end. The bracket mounts a spindle coupled to a motor for rotation of the spindle, which carries a length of cable. A power supply powers the motor to rotate the spindle and shorten or lengthen the unspooled portion of the cable. The rod mounts a block at the distal end and the cable passes through the hollow rod and out an aperture of the block. The free end of the cable is then attached at the block, such that a portion of the cable exiting the rod forms an adjustable loop. A switch connects the motor to the DC power supply, thereby turning the spindle to shorten the third portion of the cable forming the loop, such that an animal can be captured within the loop as a circumference of the loop is reduced.

2 Claims, 4 Drawing Sheets

(56) References Cited

U.S. PATENT DOCUMENTS

| | | | | |
|---|---|---|---|---|
| 6,012,416 A | * | 1/2000 | Lammers | A01K 15/003 119/803 |
| 2002/0194772 A1 | * | 12/2002 | Akhtar | A01K 77/00 43/107 |
| 2013/0144311 A1 | * | 6/2013 | Fung | A61B 17/12013 606/139 |
| 2013/0327281 A1 | * | 12/2013 | Michels | A01K 15/003 294/24 |
| 2014/0223801 A1 | * | 8/2014 | McBride | A01M 23/34 43/87 |
| 2022/0408694 A1 | * | 12/2022 | Brice | A01K 15/003 |

* cited by examiner

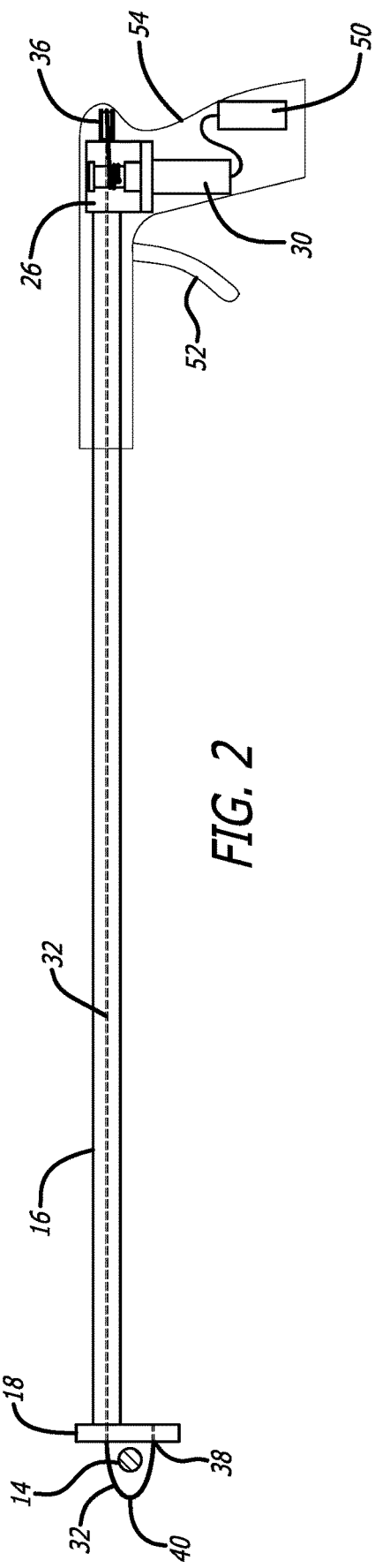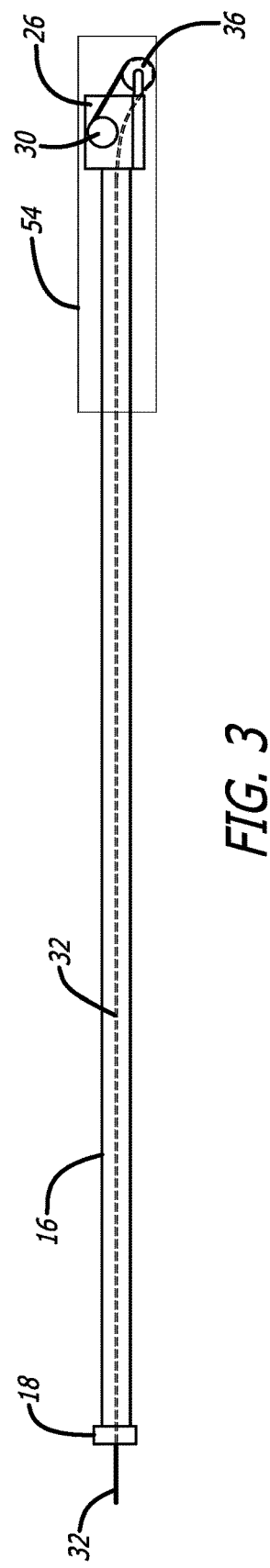

HAND HELD SNAKE SNARE

BACKGROUND

Snake traps have been used for centuries as a means of controlling and capturing snakes, particularly in areas where venomous species pose a threat to human and animal populations. Throughout history, various types of snake traps have been devised, ranging from simple pit traps to more elaborate mechanical devices. The earliest known snake traps can be traced back to ancient civilizations, where people used natural materials such as branches, stones, and pits to ensnare these reptiles. Over time, as human settlements expanded and the need for snake control grew, the design and construction of snake traps became more sophisticated, incorporating different mechanisms to improve effectiveness.

However, snake traps come with several disadvantages. One major drawback is the risk of unintentionally capturing non-target species, including harmless snakes and other wildlife. This can lead to ecological imbalances and harm to non-threatening animals. Additionally, if not checked regularly, trapped snakes can suffer from dehydration, starvation, or stress, which raises ethical concerns. Furthermore, some types of snake traps can be dangerous for non-target animals, such as pets, and can potentially cause injury or even death. In some cases, trapped snakes may become agitated and aggressive, posing a risk to anyone attempting to release or dispose of them.

In recent times, there has been a growing emphasis on the development of more humane and environmentally friendly methods for snake management, including traps without poison and with no harmful effects to the environment. Further, it is important that a trap be selective so as not to indiscriminately trap the wrong animal. The present invention is an improvement over existing traps and provides a safe, reliable hand-held snake snare that can be used with a wide variety of snakes (or other animals such as iguanas, eels, etc.) and is easy to use.

SUMMARY OF THE INVENTION

The present invention is a hand-held snare used for encircling an animal's neck with a noose and then activating a motor to cinch the flexible cable or wire to capture and, if desired, suffocate the animal quickly. The size of the noose can be adjusted to selectively capture a particular target snake, animal, etc., and disposal is quick and easy as well.

The snare comprises an elongate hollow rod with a bracket attached at a first end. The bracket mounts a spindle that rotates within an opening on the bracket, and an electric motor that turns the spindle clockwise and counterclockwise. An on/off switch is connected to a DC power supply and actuates and deactivates the motor. Fixed to and wound about the spindle is a cable such as a monofilament that passes over a pulley also mounted on the bracket, where the cable exits the pulley and passes through the hollow rod. On the distal end of the rod is mounted a block with first and second holes. The cable having passed through the elongate rod extends through one of said holes and into the other, creating flexible loop. The end of the cable is fixed to the block at the second hole, such that the size of the loop is controlled by the position of the spindle. That is, the spindle can unspool the cable to increase the loop and wind the cable to tighten the loop. The length of the elongate rod provides a safe buffer between the snake or other animal and the user.

These and other features of the invention will best be understood with reference to the accompanying figures enumerated below along with the detailed description of the invention that follows.

BRIEF DESCRIPTION OF THE DRAWINGS

FIGS. 2 and 4 are a side views, partially cut away, of the embodiment of FIG. 1;

FIG. 3 is a top view, partially cut away, of the embodiment of FIG. 1.

DETAILED DESCRIPTION OF THE PREFERRED EMBODIMENTS

Figure 1:
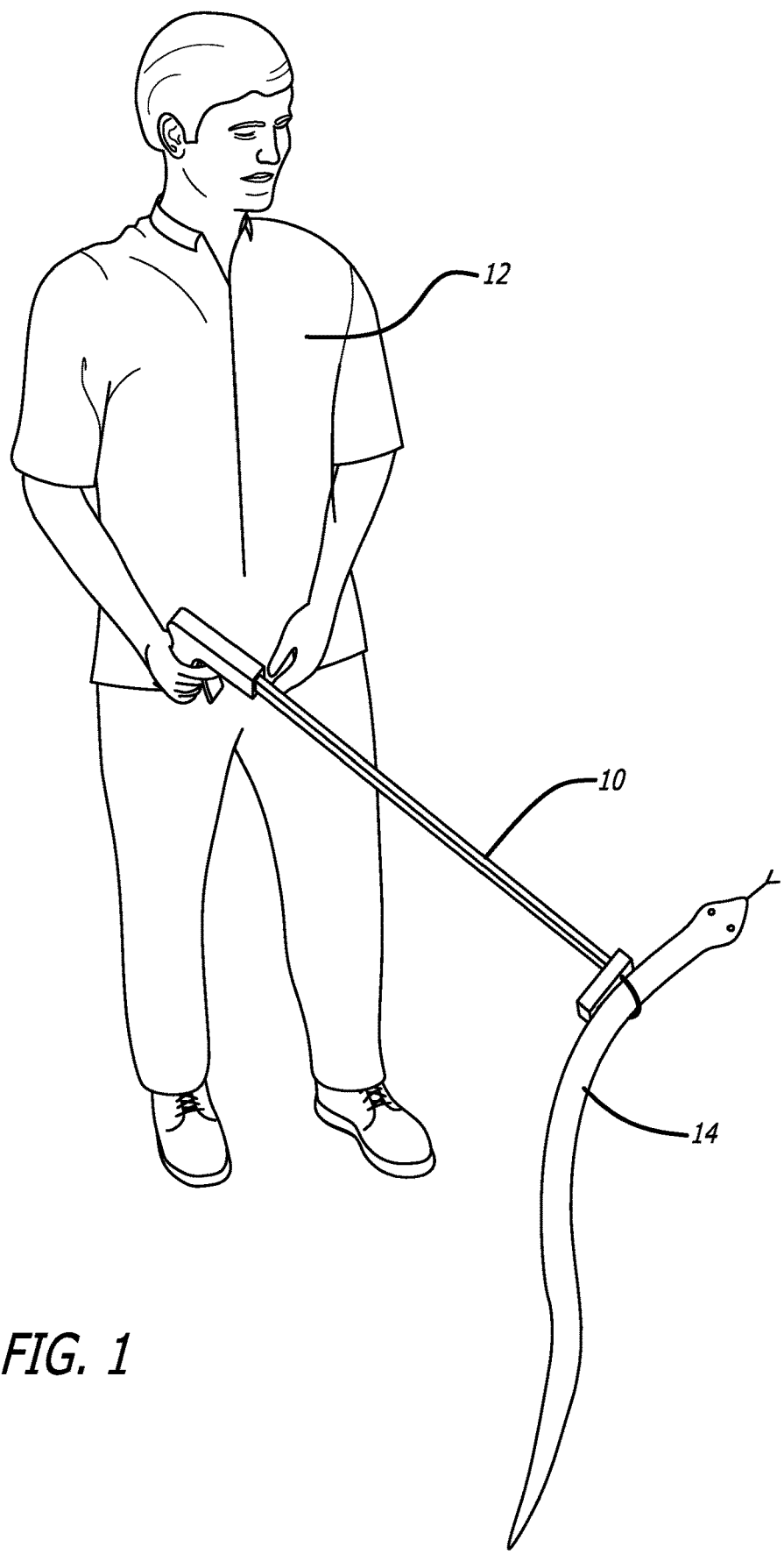
FIG. 1 is a perspective view of a first embodiment of the present invention.
Figure 4:
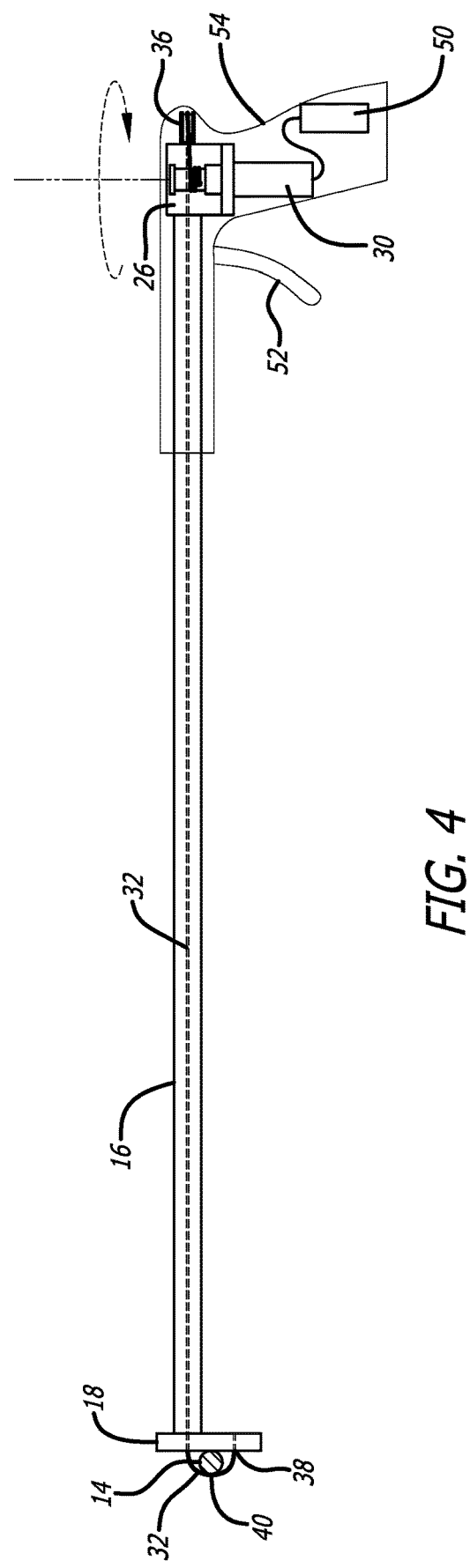
Figure 5:
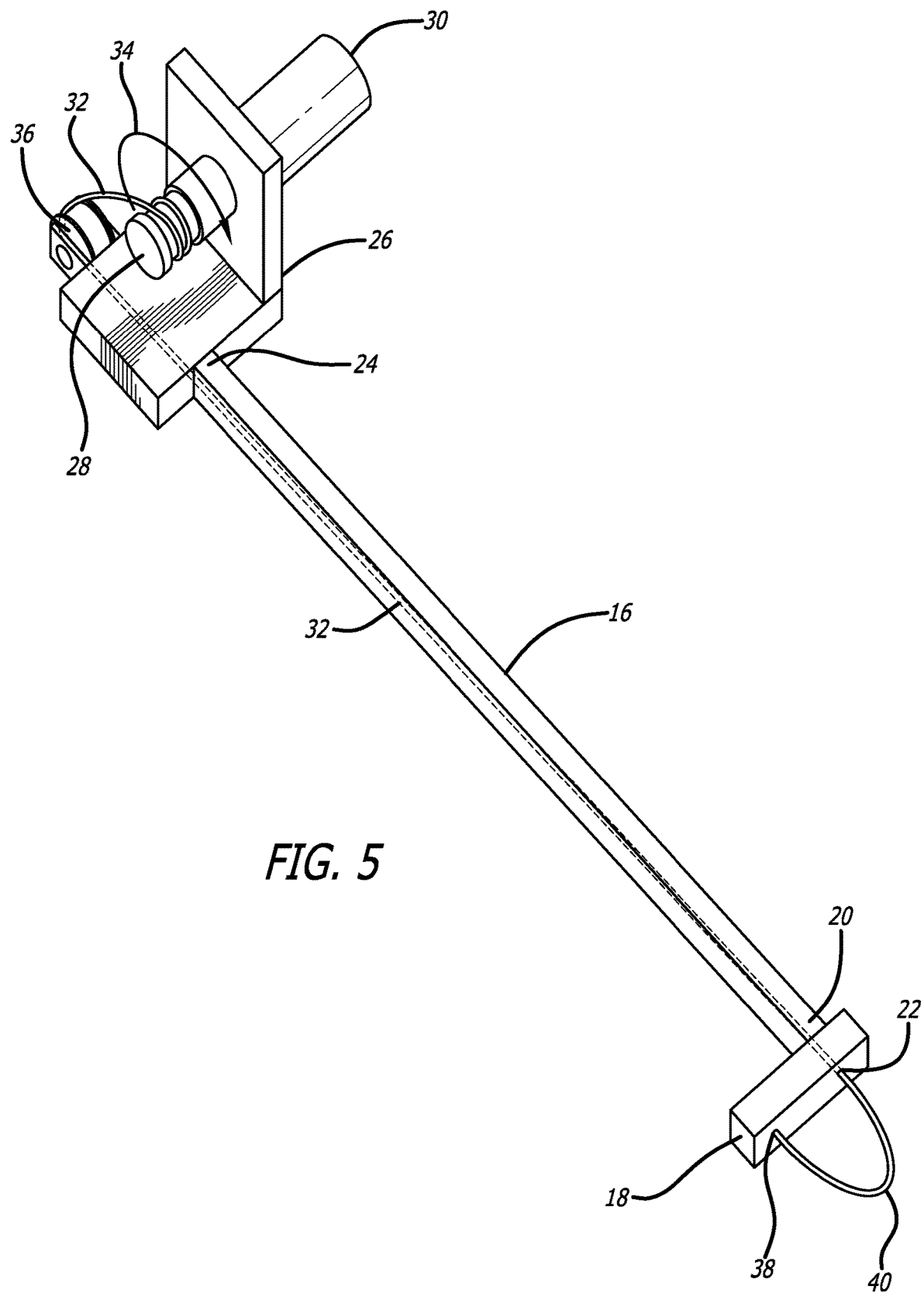
FIG. 5 is an elevated, perspective view of the embodiment of FIG. 1

FIG. 1 illustrates a hand-held snake snare 10 held by a user 12 for capturing a snake 14. The snare 10 is hand-held to allow the user to move to the snake (or other animal to be captured) instead of waiting for the snake to move to the trap. As best seen in FIG. 5, the noose 10 includes an elongate hollow shaft or rod 16 that has a block 18 attached to a distal end 20. The block 18 has a hole 22 aligned with the longitudinal axis of the rod 16.

At the proximal end 24 of the rod 16 is an L-shaped bracket 26. The bracket 26 mounts a spindle 28 for rotation about an axis that is transverse with the longitudinal axis of the rod 16. The spindle 28 is rotated by a motor 30, preferably in both a clockwise (see arrow 34) and counterclockwise direction. The motor may be concealed in a housing 54 and connected to a power supply 50 and can be controlled by a switch 52. The spindle carries a cable 32 that has a first portion that is wrapped around the spindle 28, including a first end of the cable that is attached to the spindle. The cable 32 has a second portion that extends from the spindle 28, over a pulley 36, through the hollow elongate rod 16, to the hole 22 of the block. A third portion of the cable forms a loop 40 adjacent the distal end 20 of the rod 16, including a second end 38 of the cable that is fixedly attached to the block 18.

FIGS. 2 and 3 show the snare 10 with a pistol-type trigger mechanism. The cable 32 extends through the block 18 and forms a loop 40.

The way in which an animal is trapped is now described. The snare 10 is readied with the flexible loop 40 extending from the distal end 20 of the snare and the size of the loop 40 selected for the snake 14 or animal to be captured. A power button may be provided for the circuit or the device may rely solely on the switch 52. The snare 10 is mobile (depending upon the power source 50) and can be carried to the animal 14 to be trapped. Maneuvering the distal end of the snare, the user 12 places the flexible loop 40 over the snake's neck. Once the loop in is position with the snake inside, the switch 52 is activated to electrify the electrical motor 30, which in turn rotates the spindle 28. Since the first end of the cable 32 is attached to the spindle 28, rotation of the spindle winds the cable around the spindle such that the length of the second portion of the cable is reduced. The shortening of the cable's length causes the diameter of the loop to lessen, thereby tightening the loop 40 around the animal's neck quickly. This rapid reduction in the loop's size captures the animal inside the loop as shown in FIG. 1. The switch 52 can be released to deactivate the motor 30 once the animal 14 is securely trapped, and the animal will suffocate if that is the user's intention. In some cases, the animal can be captured without killing the animal so that it can be displaced to a new location.

The particular shape of the rod/block/bracket/housing can be changed depending upon the application and the preference of the user without departing from the scope of the invention.

I claim:

1. A hand-held snake snare, comprising:
   an elongate hollow rod;
   a handle mounted on a proximal end of the rod;
   a spindle rotatably mounted inside the handle;
   an electric motor mounted inside the handle and operably connected to the spindle;
   a switch connected to a power supply for activating the electric motor;
   a block mounted to a distal end of the rod, the block having an aperture therein through;
   a cable having a first end affixed to the spindle and a second end affixed to the block, a first portion of the cable wound about the spindle, a second portion of the cable passing through the elongate hollow rod, and a third portion forming a loop at the distal end of the elongate hollow rod;
   wherein an activation of the electric motor rotates the spindle to shorten, and lengthen, the third portion of the cable; and
   wherein an animal can be captured within the loop as a circumference of the loop is reduced.

2. The hand-held snake snare of claim 1, wherein the cable passes over a pulley between the spindle and the elongate hollow rod.

* * * * *